(12) United States Patent
Suzuki

(10) Patent No.: US 6,208,013 B1
(45) Date of Patent: Mar. 27, 2001

(54) MICROACTUATOR WITH AN IMPROVED SEMICONDUCTOR SUBSTRATE AND METHOD OF FORMING THE SAME

(75) Inventor: Kenichiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,639

(22) Filed: May 25, 1999

(30) Foreign Application Priority Data

May 25, 1998 (JP) .................................................. 10-142458

(51) Int. Cl.$^7$ ....................................................... H02N 1/00
(52) U.S. Cl. ........................... 257/623; 257/415; 310/309
(58) Field of Search .................................... 310/309, 308; 257/415, 618, 623

(56) References Cited

FOREIGN PATENT DOCUMENTS

| 6-17822 | 1/1994 | (JP) . | |
|---|---|---|---|
| 6-53206 | 2/1994 | (JP) . | |
| 6-245551 | 9/1994 | (JP) . | |
| 8-23685 | 1/1996 | (JP) . | |
| 10327588 | * 12/1998 | (JP) | ........................................ 310/309 |
| 41032305 | * 12/1998 | (JP) | ........................................ 310/309 |

OTHER PUBLICATIONS

Long–Sheng Fan et al., "Magnetic Recording Head Positioning at Very High Track Densities Using a Microactuator–Based, Two–Stage Servo System", IEEE Transactions on Industrial Electronics, vol. 42, No. 3, Jun. 1995, pp. 222–233.

A. Benitez et al., "Bulk silicon microelectromechanical devices fabricated from commercial bonded and etchedback silcon–on–insulator substrates", Sensors and Actuators, vol. 50, 1995, pp. 99–103.

Youngjoo Yee et al., "Polysilicon Surface Modification Technique to Reduce Sticking of Microstructures", Transducers, Jun. 25–29, 1995, pp. 206–209.

* cited by examiner

Primary Examiner—Olik Chaudhuri
Assistant Examiner—Nathan W. Ha
(74) Attorney, Agent, or Firm—Young & Thompson

(57) ABSTRACT

The present invention provides semiconductor substrate for a microactuator having at least a movable part and a stator, wherein the semiconductor substrate has a plurality of semiconductor tapered projections being unitary formed with the semiconductor substrate and being in contact with only part of the stator, and at least a recessed portion defined in plane shape by the semiconductor tapered projections so that the recessed portion extends under entire bottom surfaces of the movable part and under partial bottom surfaces of the stator.

8 Claims, 18 Drawing Sheets

MICROACTUATOR WITH AN IMPROVED SEMICONDUCTOR SUBSTRATE AND METHOD OF FORMING THE SAME

BACKGROUND OF THE INVENTION

The present invention relates to a microactuator and a method of forming the same, and more particularly to a micro-actuator suitable for driving a small size device such as optical devices, optomagnetic and magnetic devices.

A convention small actuator is mounted on a top of a suspension of a magnetic head for driving a slider. This was proposed by L. S. Fan and is disclosed in IEEE Transactions On Industrial Electronics, vol. 42, No. 3, pp. 222–233, June 1995 entitled "Magnetic Recording Head Positioning At Very High Track Densities Using A Microactuator Based Two-Stage Servo System". FIG. 1 is a plane view illustrative of a conventional microactuator. FIG. 2 is a partially enlarged view of an area "A" in FIG. 1 illustrative of the conventional microactuator. FIG. 3 is a cross sectional elevation view illustrative of the conventional microactuator taken along an A—A line in FIG. 2. In FIGS. 1 and 2, illustrations of a structure of a platform are eliminated. The microactuator has a pair of stators 83 and 84 provided on opposite sides of a silicon substrate 100 and separated from each other in a first direction, and a movable part 82 positioned between the stators 83 and 84. The movable part 82 is supported by spring members 81 which are provided on spring fixing stages 80 fixed to the silicon substrate 100 so that he movable part 82 is floated or isolated from the silicon substrate 100.

Each of the stators 83 and 84 has a stator extending portion which extends toward inside regions and in the first direction and also extends along a longitudinal center line. The stator extending portion has many stator comb-tooth portions 91 which extend from both sides of each of the stator extending portions in a second direction perpendicular to the first direction, thereby to form a comb-shape, wherein the stator comb-tooth portions 91 are arranged at a first constant pitch in the first direction and extend in the second direction. Each of the stator comb-tooth portions 91 has comb-tooth shaped stator electrodes 93 which extend from one side of the stator comb-tooth portion 91, wherein the comb-tooth shaped stator electrodes 93 extend in the first direction at a second constant pitch.

Each of the movable part 2 comprises first and second side frame portions extending in the first direction and separated from each other in the second direction and a center frame portion extending in the second direction to connect the first and second side frame portions to each other. Each of the first and second side frame portions has many movable comb-tooth portions 92 which extend from the side toward the longitudinal center line in the second direction, thereby to form a comb-shape, wherein the movable comb-tooth portions 92 are arranged at a third constant pitch in the second direction and extend in the first direction. The many movable comb-tooth portions 92 and the many stator comb-tooth portions 91 are alternately aligned in the first direction, whereby each of the many movable comb-tooth portions 92 is positioned between adjacent two of the many stator comb-tooth portions 91. Each of the movable comb-tooth portions 92 has comb-tooth shaped movable electrodes 94 which extend from one side of the movable comb-tooth portion 92, wherein the comb-tooth shaped movable electrodes 94 extend in the first direction at a fourth constant pitch, so that the comb-tooth shaped movable electrodes 94 and the comb-tooth shaped stator electrodes 93 are alternately aligned in the second direction, whereby each of the comb-tooth shaped movable electrodes 94 is positioned between adjacent two of the comb-tooth shaped stator electrodes 93. The stator comb-tooth portion 91 is wider in width than the movable comb-tooth portion 92. The comb-tooth shaped stator electrodes 93 are wider in width than the comb-tooth shaped movable electrodes 94. The comb-tooth shaped stator electrodes 93 are adhered onto the silicon substrate 100 together with the many stator comb-tooth portions 91. The comb-tooth shaped movable electrodes 94 are separated or floated from the silicon substrate 100 together with the movable comb-tooth portion 92.

A voltage is applied across the comb-tooth shaped movable electrodes 94 and the comb-tooth shaped stator electrodes 93 so that the movable part 82 is driven to be moved in the first direction. The voltage application across the comb-tooth shaped movable electrodes 94 of the movable part 82 and the comb-tooth shaped stator electrodes 93 of the second stator 84 causes the movable part 82 to move toward the second stator 84. The voltage application across the comb-tooth shaped movable electrodes 94 of the movable part 82 and the comb-tooth shaped stator electrodes 93 of the first stator 83 causes the movable part 82 to move toward the first stator 83.

The above conventional microactuator has been fabricated a follows. A phospho silicate pattern of 2 micrometers in thickness if formed on a first region of the silicon substrate 100, wherein the first region is for later formation of the above movable part 82. A photo-resist pattern is then formed on the phospho silicate glass pattern by use of a photo-lithography technique. A copper plating method is carried out to form copper films between apertures of the photo-resist pattern. A platform pattern is then formed by use of other photo-lithography technique and subsequent copper plating method before the phospho silicate glass pattern is removed by an etchant of hydrofluoric acid solution so as to isolate the movable part 82 and the comb-tooth shaped movable electrodes 94 from the silicon substrate 100, whereby the microactuator and the platform are formed. Namely, this actuator is formed by the electro-plating technique.

By the way, it has been known in the part that a polysilicon thin film is used for the microactuator fabricated by utilizing a silicon IC process. This microactuator having the polysilicon thin film is superior in conformability with the silicon IC process and also in mechanical characteristics as compared to the above electroplate microactuator. In order to apply this second microactuator having the polysilicon film to the magnetic had or the optomagnetic head, it is, however, necessary to suppress motion of the head in other directions to the intended direction. For example, the microactuator shown in FIG. 1 is required to cause the movable part 82 to move in the first direction but required to suppress any motion of the movable part 82 in a vertical direction to the first and second directions. In order to suppress the motion of the movable part 82 in the vertical direction, it is effective to increase the thickness of the springs 81. In view of utilizing a large electrostatic force, it is also important to increase the thicknesses of the comb-tooth shaped movable electrodes 94 and the comb-tooth shaped stator electrodes 93.

Accordingly, it had been required to form the actuator having a thickness of not less than 20 micrometers. Notwithstanding, a practically possible maximum thickness of the polysilicon film is about 4 micrometers which is much thinner than the required thickness. For those reasons, the above plating technique for forming the electro-plated actuator and the following other type microactuator had been developed. The other type microactuator may be formed by etching technique for etching a single crystal silicon layer.

The actuator having the silicon crystal silicon film may be formed by use of an silicon-on-insulator substrate. This technique was proposed by A. Benitez et al. and is disclosed in Sensors and Actuators, A50, pp. 99–103, 1995, entitled "bulk silicon microelectromechanical devices fabricated from commercial bonded and etched-back silicon-on-insulator substrates". The use of this technique allows the comb-tooth shaped movable electrodes 94 and the comb-tooth shaped stator electrodes 93 to be formed from a single crystal silicon layer of 20 micrometers in thickness. The comb-tooth shaped stator electrodes 93 and the many stator comb-tooth portions 91 are fixed through a silicon oxide layer to the silicon substrate 100. The silicon oxide film underlying the comb-tooth shaped movable electrodes 94 is removed by a hydrofluoric acid solution as an etchant, so that the comb-tooth shaped movable electrodes 94 is made floated or isolated from the silicon substrate 100. Since the comb-tooth shaped movable electrodes 94 is narrower in width than the comb-tooth shaped stator electrodes 93 and also the movable comb-tooth portions 92 is narrower in width than the stator comb-tooth portions 91, and silicon oxide film remains under the comb-tooth shaped stator electrodes 93 and the stator comb-tooth portions 91 even after the wet etching has been carried out by use of the hydrofluoric acid solution. The comb-tooth shaped movable electrodes 94 having the single crystal silicon film and the comb-tooth shaped stator electrodes 93 also having the single crystal silicon film may be formed over the silicon substrate 100.

The comb-tooth shaped movable electrodes 94 may accidentally be made into contact with the silicon substrate 100 during the operation of the microactuator. If the comb-tooth shaped movable electrodes 94 is hit to the silicon substrate 100, the comb-tooth shaped movable electrodes 94 might be adhered to the silicon substrate 100, whereby the movable part 82 becomes inoperable. In the isolation process or isolating the comb-tooth shaped movable electrodes 94 from the silicon substrate 100, a water used for cleaning process is removed by dry process, whereby the surface tension of water might cause the comb-tooth shaped movable electrodes 94 to be adhered to the silicon substrate 100. This adhesion problem is particularly remarkable when the single crystal silicon is used for the microactuator material because the image-force is applied between the comb-tooth shaped movable electrodes 94 and the silicon substrate 100. This adhesion problem is also risen when the microactuator is fabricated by the copper-electroplating method.

A method of solving the above adhesion problem was proposed by T. Yee et al. and is disclosed in Digest of the 8$^{th}$ international conference on solid-state sensors and actuators, vol. 1, pp. 206–209, June 1995, entitled "polysilicon surface modification technique to reduce sticking of microstructures".

This method will be described as follows. FIGS. 4A through 4E are fragmentary cross sectional elevation views illustrative of the second conventional microactuator in sequential processes involved in a conventional fabrication method thereof.

With reference to FIG. 4A, a silicon oxide film 121 is deposited on a silicon substrate 120 before a polysilicon film 122 having a thickness of 0.5 micrometers is deposited on the silicon oxide film 121.

With reference to FIG. 4B, a phospho-silicate glass film 123 is formed on the polysilicon film 122 whereby oxidation is deeply progressed into deep portions of grain boundary regions of the polysilicon film.

With reference to FIG. 4C, this sample is subjected to a mask-free dry etching process to increase difference in thickness of the silicon oxide film 123, thereby forming a polysilicon film 124 having an uneven surface.

With reference to FIG. 4D, a phospho-silicate glass film 126 having thickness of 2 micrometers is deposited on the polysilicon film 124. A polysilicon film 125 having a thickness of 2 micrometers is deposited on the phospho-silicate glass film 126. The polysilicon film 125 is patterned to be shaped into an actuator.

With reference to FIG. 4E, the phospho-silicate glass film 126 is removed by a wet etching using a hydrofluoric acid solution.

The contact surface is intended to be made rough so as to reduce a contact area between the movable electrode and the substrate, whereby an attractive force of a solid surface is reduced. The method of forming uneven contact surface to reduce the friction has been known. In Japanese laid-open patent publication No. 8-23685, it is disclosed that silicon oxide projections are provided between the movable part and the substrate. Those projections are formed by photolithography techniques so that plane size of each projection is much larger than the projections made in the above process in FIG. 8C. The friction and adhesion force largely depend upon the roughness of the contact surface, for which reason the actuator fabricated by the processes of FIGS. 8A through 8E is much superior than the other conventional actuator. The process of FIG. 8C for forming the rough surface is free from any photo-lithography. This is advantageous in simplicity of the fabrication process for the microactuator. The above processes of FIGS. 8A through 8E are inapplicable to the single crystal silicon microactuator using the silicon-on-insulator wafer. In accordance with the above processes of FIGS. 8A through 8E, the rough surface has been formed on the polysilicon film 122 on the silicon oxide film 121 on the silicon substrate 100, before the polysilicon film 125 is formed to be patterned into ether the movable part or stator.

The silicon-on-insulator substrate may be commercially available from the makers to reduce the cost and secure the high quality. The film, which should have to be made into movable part or stator, has already been deposited, for which reason it is impossible to make rough the surface of the substrate by use of the conventional method of FIG. 8C.

The other conventional microactuator have been known. In Japanese laid-open patent publication No. 6-53206, it is disclosed to form an operational gap in a silicon oxide film over a substrate by selectively removing the silicon oxide film.

In the above circumstances, it had been required to develop a novel microactuator and a method of forming the same free from the above problems.

SUMMARY OF THE INVENTION

Accordingly, it is an object of the present invention to provide a novel microactuator free from the above problems.

It is a further object of the present invention to provide a novel microactuator which is free from any accidental adhesion between a movable part or a movable electrode and a substrate surface during fabrication processes for the microactuator.

It is a still further object of the present invention to provide a novel microactuator which is free from any accidental adhesion between a movable part or a movable electrode and a substrate surface during operations of the microactuator.

It is yet a further object of the present invention to provide a novel microactuator which is improved in operational stability.

It is a further more object of the present invention to provide a novel substrate structure of a microactuator free from the above problems.

It is still more object of the present invention to provide a novel substrate structure of a microactuator which is free from any accidental adhesion between a movable part or a movable electrode and a substrate surface during fabrication processes for the microactuator.

It is moreover object of the present invention to provide a novel substrate structure of a microactuator which is free from any accidental adhesion between a movable part or a movable electrode and a substrate surface during operations of the microactuator.

It is another object of the present invention to provide a novel substrate structure of a microactuator which is improved to operational stability.

It is still another object of the present invention to provide a novel method of fabricating a microactuator free from the above problems.

It is yet another object of the present invention to provide a novel method of fabricating a microactuator which is free from any accidental adhesion between a movable part or a movable electrode and a substrate surface during fabrication processes for the microactuator.

It is further another object of the present invention to provide a novel method of fabricating a microactuator which is free from any accidental adhesion between a movable part or a movable electrode and a substrate surface during operations of the microactuator.

It is an additional object of the present invention to provide a novel method of fabricating a microactuator which is improved in operational stability.

It is yet an additional object of the present invention to provide a novel method of fabricating a substrate structure of a microactuator free from the above problems.

It is a further additional object of the present invention to provide method of fabricating a substrate structure of a microactuator which is free from any accidental adhesion between a movable part or a movable electrode and a substrate surface during fabrication processes for the microactuator.

It is also additional object of the present invention to provide method of fabricating a substrate structure of a microactuator which is free from an accidental adhesion between a movable part or a movable electrode and a substrate surface during operations of the microactuator.

It is also additional object of the present invention to provide method of fabricating a substrate structure of a microactuator which is improved in operational stability.

The present invention provides a semiconductor substrate for a microactuator having at least a movable part and a stator, wherein the semiconductor substrate has a plurality of semiconductor tapered projections being unitary formed with the semiconducotr substrate and being in contact with only part of the stator, and at least a recessed portion defined in plane shape by the semiconductor tapered projections so that the recessed portion extends udner entire bottom surfaces of the movable part and under partial bottom surfaces of the stator.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
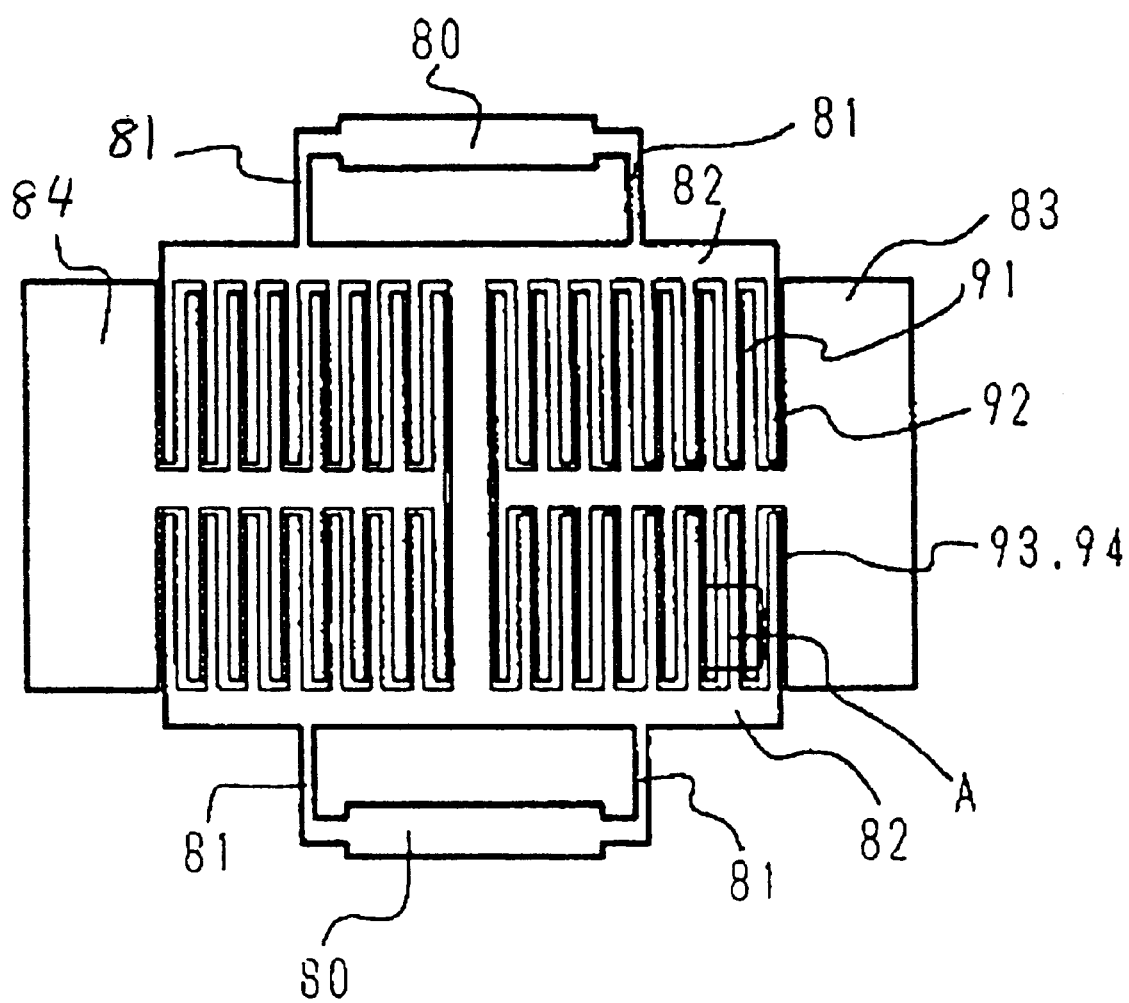
FIG. 1 is a plane view illustrative of a conventional microactuator.
Figure 2:
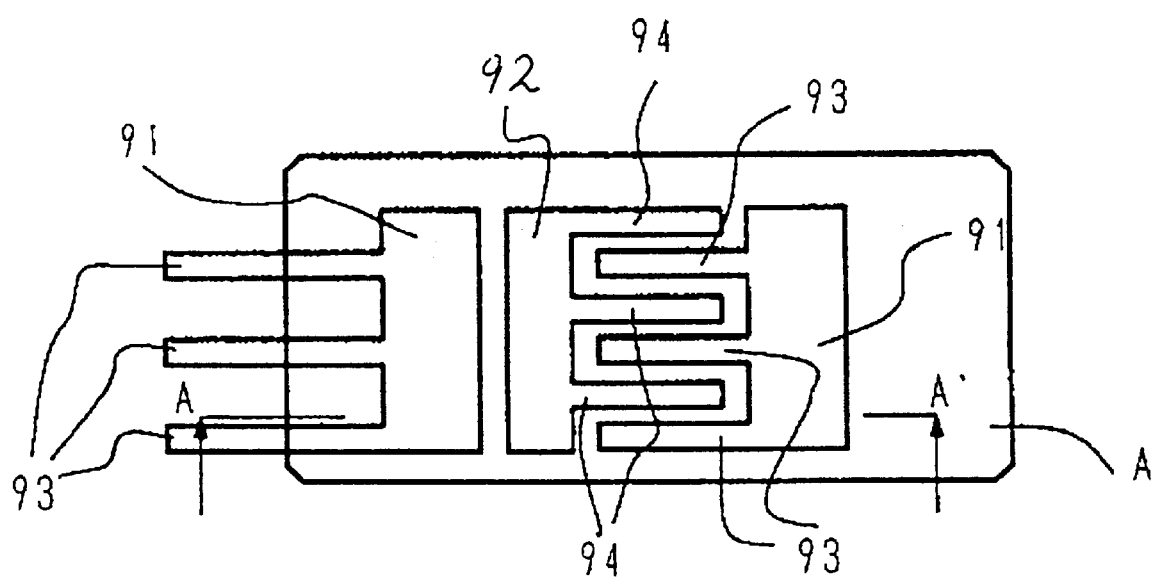
FIG. 2 is a partially enlarged view of an area "A" in FIG. 1 illustrative of the conventional microactuator.
Figure 3:
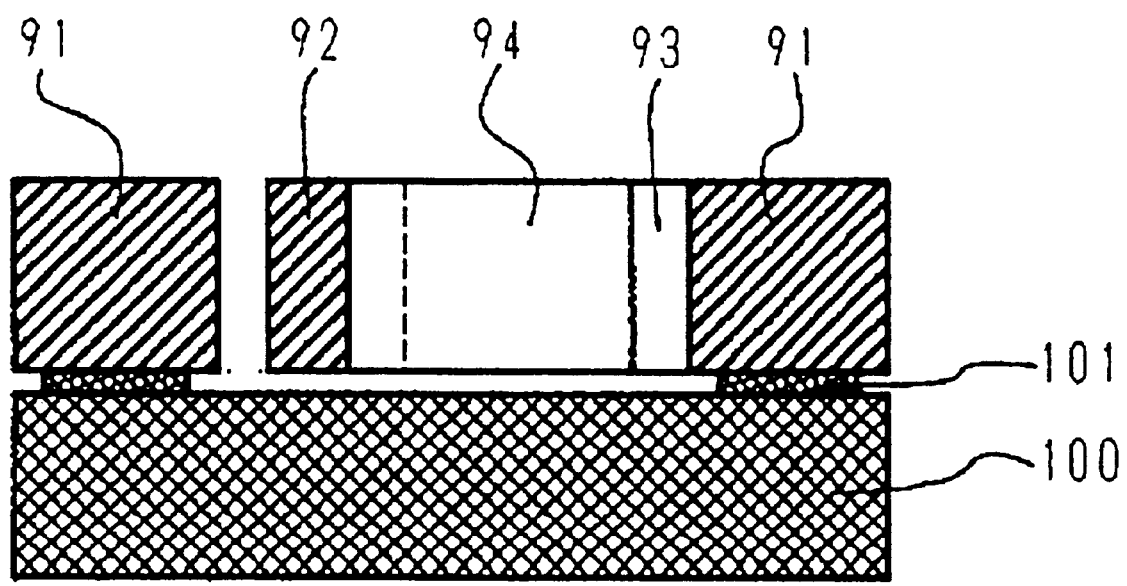
FIG. 3 is a cross sectional elevation view illustrative of the conventional microactuator taken along an A—A line in FIG. 2.
Figure 4A:
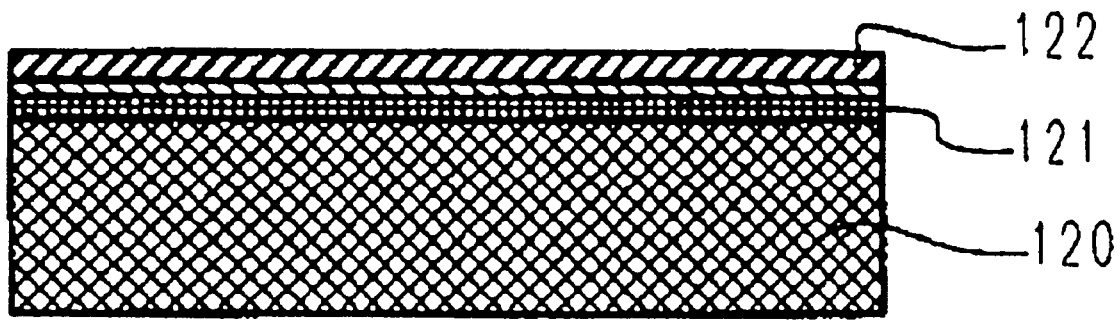
FIGS. 4A through 4E are fragmentary cross sectional elevation views illustrative of the second conventional microactuator in sequential processes involved in a conventional fabrication method thereof.
Figure 4B:
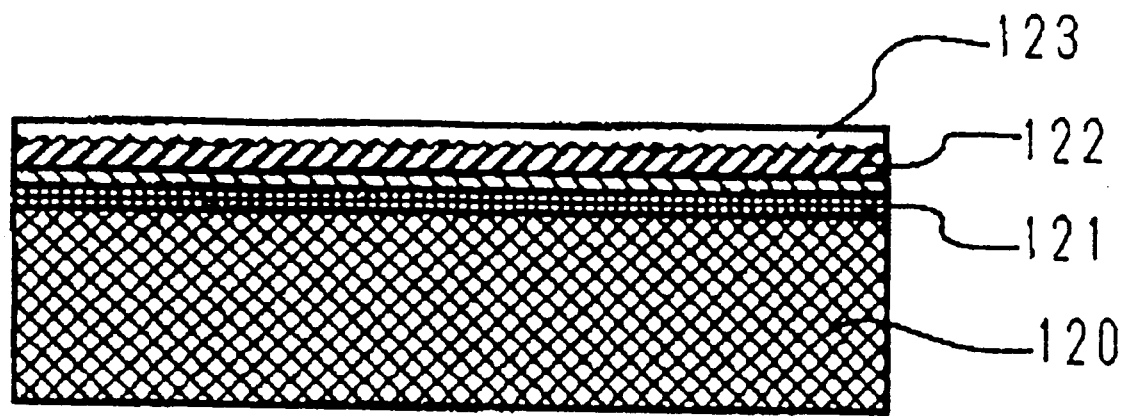
Figure 4C:
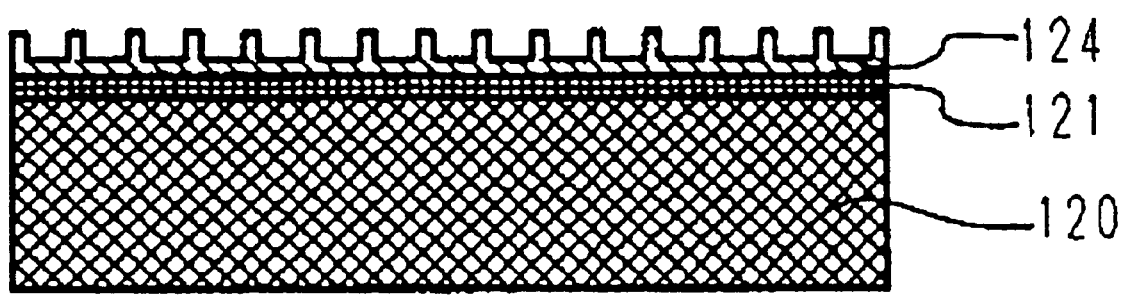
Figure 4D:
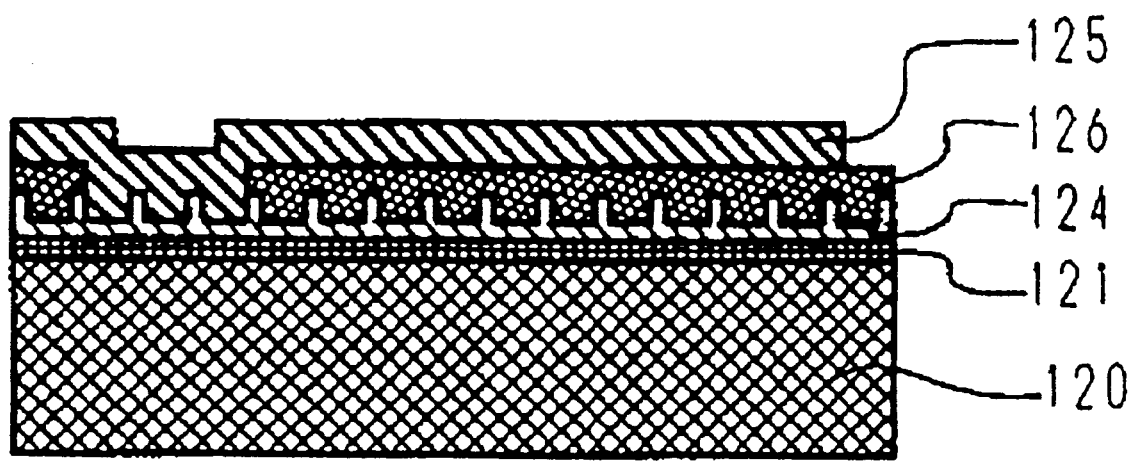
Figure 4E:
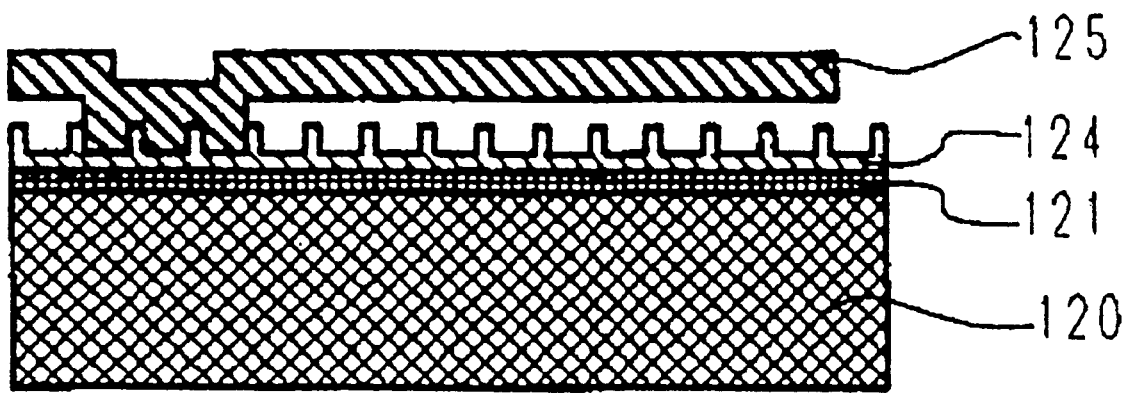

The present invention provides a semiconductor substrate for a microactuator having at least a movable part and a stator, wherein the semiconductor substrate has a plurality of semiconductor tapered projections being unitary formed with the semiconductor substrate and being in contact with only part of the stator, and at least a recessed portion defined in plane shape by the semiconductor tapered projections so that the recessed portion extends under entire bottom surfaces of the movable part and under partial bottom surfaces of the stator.

It is preferable that a height of the semiconductor tapered projections defines a depth of the recessed portion, and the depth is not less than about 10 micrometers.

In accordance with the present invention, the above substrate has the recessed portions positioned under the movable parts and the projections positioned under the stators. The recessed portions form inter-space between the movable parts and the substrate to securely prevent the movable parts from contact with the substrate, whilst the projections are to mechanically support or fix the stators. Even if the movable parts are made into contact with the substrate accidentally, the adhesion force between the movable parts and the substrate is remarkably small.

In the above embodiment, the stator is provided on the surface of the semiconductor substrate. The above improved substrate structure of the microactuator may be applicable to any various kinds of actuators. The stator is usually formed over the semiconductor substrate. However, the above improved substrate structure may be applicable to the actuator wherein the stator is mounted over the movable part. Alternatively, the above improved substrate structure may also be applicable to the actuator wherein the movable part is mounted over the stator. Further alternatively, the above improved substrate structure may also be applicable to the multilevel structured actuator, wherein a second level movable part or a second level stator is mounted over a first level movable part or a first level stator.

The other present invention provides a microactuator having a semiconductor substrate, at least a movable part and a stator, wherein the semiconductor substrate has a plurality of semiconductor tapered projections being unitary formed with the semiconductor substrate and being in contact with only part of the stator, and at least a recessed portion defined in plane shape by the semiconductor tapered projections so that the recessed portion extends udner entire bottom surfaces of the movable part and under partial bottom surfaces of the stator.

In accordance with the present invention, the above substrate has the recessed portions positioned under the movable parts and the projections positioned under the stators. The recessed portions from inter-space between the movable parts and the substrate to securely prevent the movable parts from contact with the substrate, whilst the projections are to mechanically support to fix the stators. Even if the movable parts are made into contact with the substrate accidentally, the adhesion force between the movable parts and the substrate is remarkably small.

The stator is provided on the surface of the semiconductor substrate. The above improved substrate structure for the microactuator may be applicable to any various kinds of actuators. The stator is usually formed over the semiconductor substrate. However, the above improved substrate structure may be applicable to the actuator wherein the stator is mounted over the movable part. Alternatively, the above improved substrate structure may also be applicable to the actuator wherein the movable part is mounted over the stator. Further alternatively, the above improved substrate structure may also be applicable to the multilevel structured actuator, wherein a second level movable part or a second level stator is mounted over a first level movable part or a first level stator.

It is preferable that the movable part and the stator have bottom surfaces covered with insulation films on tops of the semiconductor tapered projections, so that the bottom surfaces of the movable part and the stator are isolated by the insulation films from the tops of the semiconductor tapered projections. Top surfaces of the movable part and the stator are covered by laminations of a silicon oxide film and a silicon nitride film. The silicon nitride film has outward extensions from the edges of the silicon oxide film.

It is also preferable that at least any one of the movable part and the stator has at least one rounded corner. The corners of the stator and the movable part are rounded. The above rounded corners of each of the stator and the movable part make it easy to keep the shapes of the stator and the movable part when the semiconductor substrate is etched to form a recessed portion to be described below. The above rounded corners of each of the stator and the movable part prevents any appearance of electrostatic discharge from sharp corners upon voltage application across the stator electrode and the movable electrode, wherein the electrostatic discharge may be capable of breaking the microactuator. The above rounded corners of each of the stator and the movable part make is easy to have the silicon nitride film cover the entire side walls of the stator and the movable part.

It is also preferably that at least nay one of the movable part and the stator has side walls covered with an insulation film. Side walls of the stator electrodes and the movable electrodes are covered with a silicon nitride film to prevent any formation of the short circuit between stator electrodes and the movable electrodes even if the stator electrodes and the movable electrodes are made into contact with each other accidentally.

It is also preferable that a height of the semiconductor tapered projections defines a depth of the recessed portion, and the depth is not less than about 10 micrometers.

It is also preferable that a top surface of at least any one of the stator and the movable part is covered by laminations of a silicon oxide film and a silicon nitride film, and the silicon nitride film has peaked portions extending outwardly from edges of the silicon oxide film.

The above improved substrate structure for the microactuator may be applicable to any various kinds of actuators. The stator is usually formed over the semiconductor substrate. However, the above improved substrate structure may be applicable to the actuator wherein the stator is mounted over the movable part. Alternatively, the above improved substrate structure may also be applicable to the actuator wherein the movable part is mounted over the stator. Further alternatively, the above improved substrate structure may also be applicable to the multilevel structured actuator, wherein a second level movable part or a second level stator is mounted over a first level movable part or a first level stator.

Figure 5:
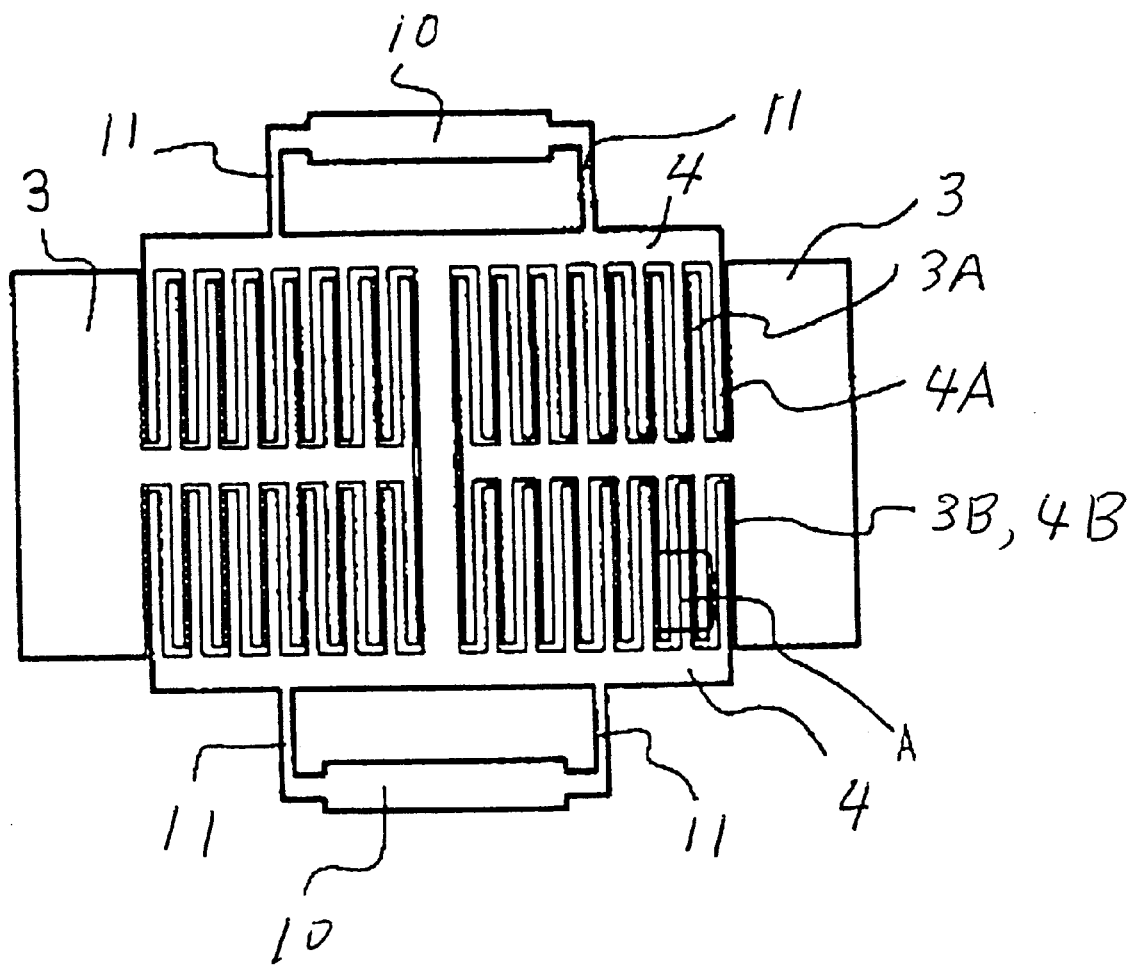
FIG. 5 is a plane view illustrative of a novel semiconductor microactuator with an improved substrate in a first embodiment in accordance with the present invention.
Figure 6:
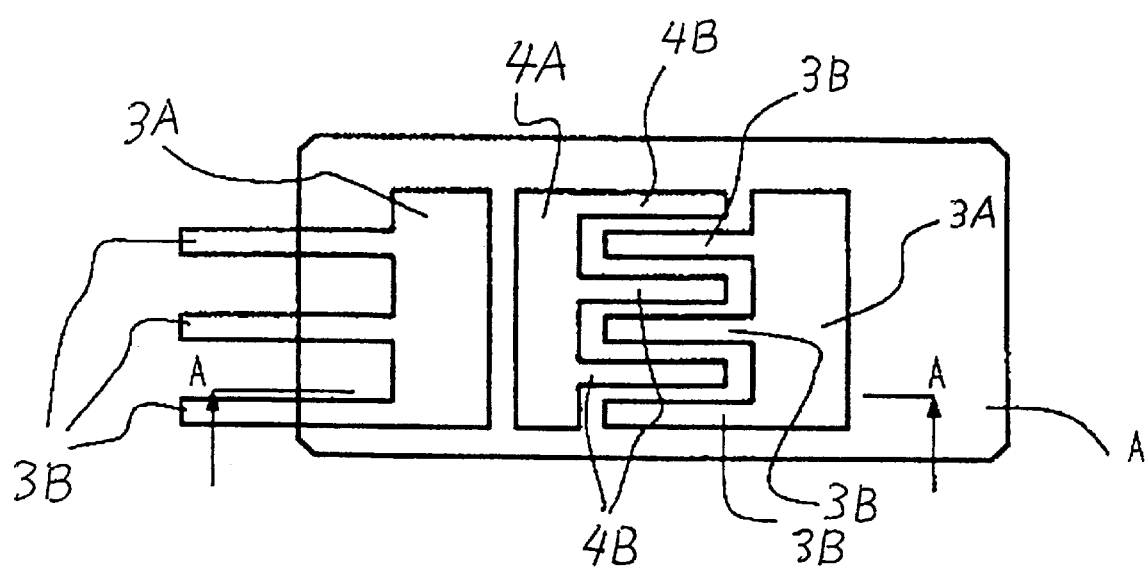
FIG. 6 is a partially enlarged plane view of a novel semiconductor microactuator with an improved substrate shown in FIG. 5 in a first embodiment in accordance with the present invention.
Figure 7:
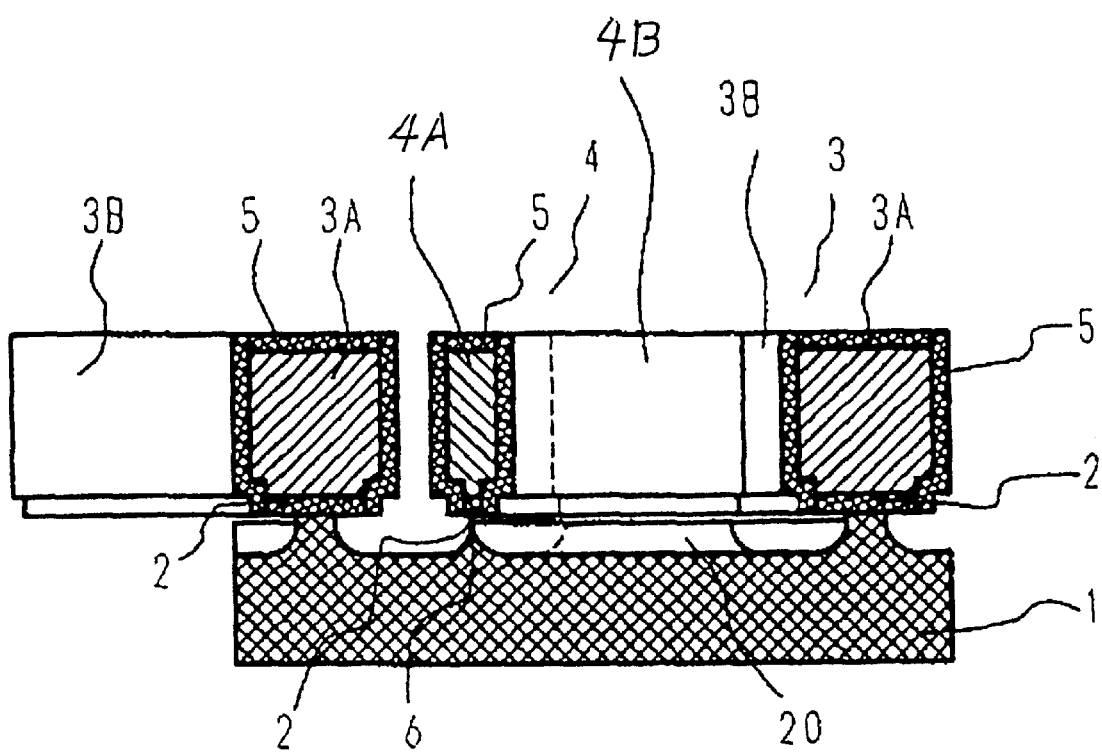
FIG. 7 is a cross sectional elevation view illustrative of a novel semiconductor microactuator with an improved substrate in a first embodiment in accordance with the present invention.

A first embodiment according to the present invention will be described in detail with reference to the drawings. FIG. 5 is a plane view illustrative of a novel semiconducotr microactuator with an improved substrate in a first embodiment in accordance with the present invention. FIG. 6 is a partially enlarged plane view of a novel semiconductor microactuator with an improved substrate shown in FIG. 5 is a first embodiment in accordance with the present invention. FIG. 7 is a cross sectional elevation view illustrative of a novel semiconductor microactuator with an improved substrate in a first embodiment in accordance with the present invention.

The microactuator has a stator 3, and a movable part 4. The movable part 4 is supported by spring members 11 which are provided on spring fixing stages 10 fixed to the silicon substrate 1 so that the movable part 4 is floated or isolated from the silicon substrate 1.

The stator 3 has a stator extending portion which extends toward inside regions and in the first direction and also extends along a longitudinal center line. The stator extending portion has many stator comb-tooth portions 3A which extend from both sides of each of the stator extending portions in a second direction perpendicular to the first direction, thereby to form a comb-shape, wherein the stator comb-tooth portions 3A are arranged at a first constant pitch in the first direction and extend in the second direction. Each of the stator comb-tooth portions 3A has comb-tooth shaped stator electrodes 3B which extend from one side of the stator comb-tooth portion 3A, wherein the comb-tooth shaped stator electrodes 3B extend in the first direction at a second constant pitch.

The movable part 4 comprises first and second side frame portions extending in the first direction and separated from each other in the second direction and a center frame portion extending in the second direction to connect the first and second side frame portions to each other. Each of the first and second side frame portions has many movable comb-tooth portions 4A which extend from the side toward the longitudinal center line in the second direction, thereby to form a comb-shape, wherein the movable comb-tooth portions 4A are arranged at a third constant pitch in the second direction and extend in the first direction. The many movable comb-tooth portions 4A and the many stator comb-tooth portions 3A are alternately aligned in the first direction, whereby each of the many movable comb-tooth portions 4A is positioned between adjacent two of the many stator comb-tooth portions 3A. Each of the movable comb-tooth portions 4A has comb-tooth shaped movable electrodes 4B which extend from one side of the movable comb-tooth portion 4A, wherein the comb-tooth shaped movable electrodes 4B extend in the first direction at a fourth constant pitch, so that the comb-tooth shaped movable electrodes 4B and the comb-tooth shaped stator electrodes 3B are alternately aligned in the second direction, whereby each of the comb-tooth shaped movable electrodes 4B is positioned between adjacent two of the comb-tooth shaped stator electrodes 3B. The stator comb-tooth portion 3A is wider in width than the movable comb-tooth portion 4A. The comb-tooth shaped stator electrodes 3B are wider in width than the comb-tooth shaped movable electrodes 4B. The comb-tooth shaped stator electrodes 3B are adhered onto the silicon substrate 1 together with the many stator comb-tooth portions 3A. The comb-tooth shaped movable electrodes 4B are separated or floated from the silicon substrate 1 together with the movable comb-tooth portion 4A.

As illustrated in FIG. 7, the above substrate 1 has a surface which comprises recessed portions 20 positioned under the movable parts 4 and projections 6 under the stators 3, wherein the recessed potions 20 are to form inter-space between the movable parts 4 and the substrate 1 to securely prevent the movable parts 4 from contact with the substrate 1, whilst the projections 6 are to mechanically support or fix the stators 3. Top surfaces and side walls of the stator 3 and the movable part 4 are covered with an insulation film 5. Bottom surfaces of the stator 3 and the movable part 4 are covered with the oxide films 2.

A voltage is applied across the comb-tooth shaped movable electrodes 4B and the comb-tooth shaped stator electrodes 3B so that the movable part 4 is driven to be moved in the first direction. The voltage application across the comb-tooth shaped movable electrodes 4B of the movable part 4 and the comb-tooth shaped stator electrodes 3B of the second stator 3 causes the movable part 4 to move toward the second stator 3. The voltage application across the comb-tooth shaped movable electrodes 4B of the movable part 4 and the comb-tooth shaped stator electrodes 3B of the first stator 3 causes the movable part 4 to move toward the first stator 4.

The movable comb-tooth portion 4A may comprise a single crystal silicon pattern having a width of 3 micrometers and a height of 20 micrometers. The stator comb-tooth portion 3A may comprise a single crystal silicon pattern having a width of 10 micrometers and a height of 20 micrometers. The comb-tooth shaped stator electrode 3B may comprise a single crystal silicon pattern having a width of 3 micrometers and a height of 20 micrometers. The comb-tooth shaped movable electrode 4B may comprise a single crystal silicon pattern having a width of 3 micrometers and a height of 20 micrometers. The comb-tooth shaped stator electrode 3B is spaced from the silicon substrate 1. The stator comb-tooth portion 3A is however fixed to the substrate 1 so that the comb-tooth shaped stator electrode 3B is substantially fixed through the stator comb-tooth portion 3A to the substrate 1. The insulation film 5 may comprise either a silicon oxide film having a thickness of 100 nanometers or a silicon nitride film having a thickness of 100 nanometers or a complex material thereof. The materials may be different between the top insulation film on the top surfaces of the movable part 4 and the stator 3 and the side insulation film on the side wall of the movable part 4 and the stator 3. For example, the silicon oxide film is provided on the top surfaces of the movable part 4 and the stator 3, whilst the silicon nitride film is provided on the side walls of the movable part 4 and the stator 3. The thickness of the silicon oxide film 2 may, for example, be 0.5 micrometer. A distance between the top portions of the projections 6 and the bottom surface of the oxide film 2 on the bottom of the movable comb-tooth portion 4A may, for example, be 2 micrometers. The projections 6 may have a height of 10 micrometers.

In accordance with the present invention, the above substrate 1 has the recessed portions 20 positioned under the movable parts 4 and the projections 6 positioned under the stators 3. The recessed potions 20 form inter-space between the movable parts 4 and the substrate 1 to securely prevent the movable parts 4 form contact with the substrate 1, whilst the projections 6 are to mechanically support or fix the stators 3. Even if the movable parts 4 are made into contact with the substrate 1 accidentally, the adhesion force between the movable parts 4 and the substrate 1 is remarkably small.

Further, in accordance with the present invention, the top surfaces and the side walls of the stator 3 and the movable part 4 are covered with the insulation film 5. The bottom surfaces of the stator 3 and the movable part 4 are covered with the oxide films 2. Even if the comb-tooth shaped movable electrodes 4B of the movable part 4 and the comb-tooth shaped stator electrodes 3B of the stator 3 are made into contact with each other, the insulation film 5 prevents any formation of the short circuit between the comb-tooth shaped movable electrodes 4B and the comb-tooth shaped stator electrodes 3B.

As a modification, it is possible that the insulation film 5 is not provided. It is also possible that the insulation film 5 is provided only to the side walls of the comb-tooth shaped movable electrodes 4B and the comb-tooth shaped stator electrodes 3B. It is also possible that the insulation film 5 is provided only on the side wall of any one of the comb-tooth shaped movable electrodes 4B and the comb-tooth shaped stator electrodes 3B.

In the above embodiment, the stator and the movable part are coated by the insulation film such as the silicon oxide film or the silicon nitride film. It is, however, possible as a modification that metal films such as tungsten, titanium, titanium nitride may be formed by a chemical vapor deposition method. It is further possible that an amorphous silicon may be formed by a chemical vapor deposition method. It is further possible that an organic thin film may be formed by a chemical vapor deposition method. In pace of the chemical vapor deposition method, a sputtering method or an evaporation method as well as combinations thereof are also available.

In the above embodiment, the projections 6 are formed over the substrate and under the stator 3. It is possible as a modification that, in place of formation of the projections 6, a distance between the bottom of the movable part 4 and the substrate surface is increased to securely prevent the movable parts 4 from contact with the substrate 1, whilst the projections 6 are to mechanically support or fix the stator 3. Even if the movable parts 4 are made into contact with the substrate 1 accidentally, the adhesion force between the movable parts 4 and the substrate 1 is remarkably small. If the distance between the bottom of the movable part 4 and the substrate surface is set 30 micrometers, then there appears no adhesion between the movable parts 4 and the substrate 1 even no projections are formed between the same. If, however, the distance between the bottom of the movable part 4 and the substrate surface is only a few micrometers, then sometimes the adhesion between the movable parts 4 and the substrate 1 appears.

In the above embodiment, the stator is provided on the surface of the semiconductor substrate 1. The above improved substrate structure for the microactuator may be applicable to any various kinds of actuators. The stator is usually formed over the semiconductor substrate. However, the above improved substrate structure may be applicable to the actuator wherein the stator is mounted over the movable part. Alternatively, the above improved substrate structure may also be applicable to the actuator wherein the movable part is mounted over the stator. Further alternatively, the above improved substrate structure may also be applicable to the multilevel structured actuator, wherein a second level movable part or a second level stator is mounted over a first level movable part or a first level stator.

Figure 8A:
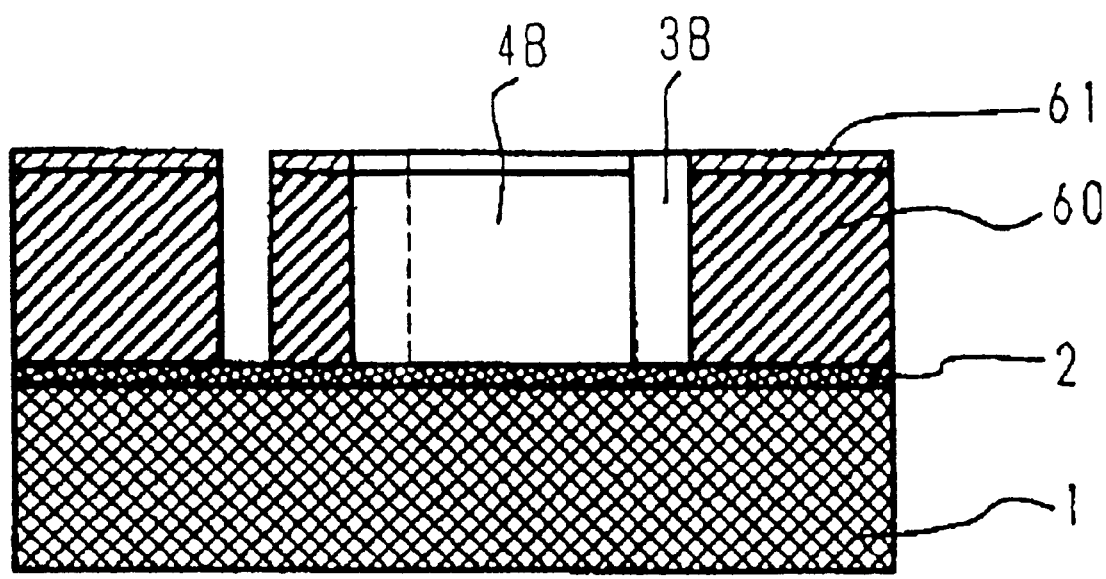
FIGS. 8A through 8C are fragmentary cross sectional elevation views illustrative of second novel actuators with improved substrate structures of FIG. 7 is sequential processes involved in a novel method of fabricating the same in a first embodiment in accordance with the present invention.
Figure 8B:
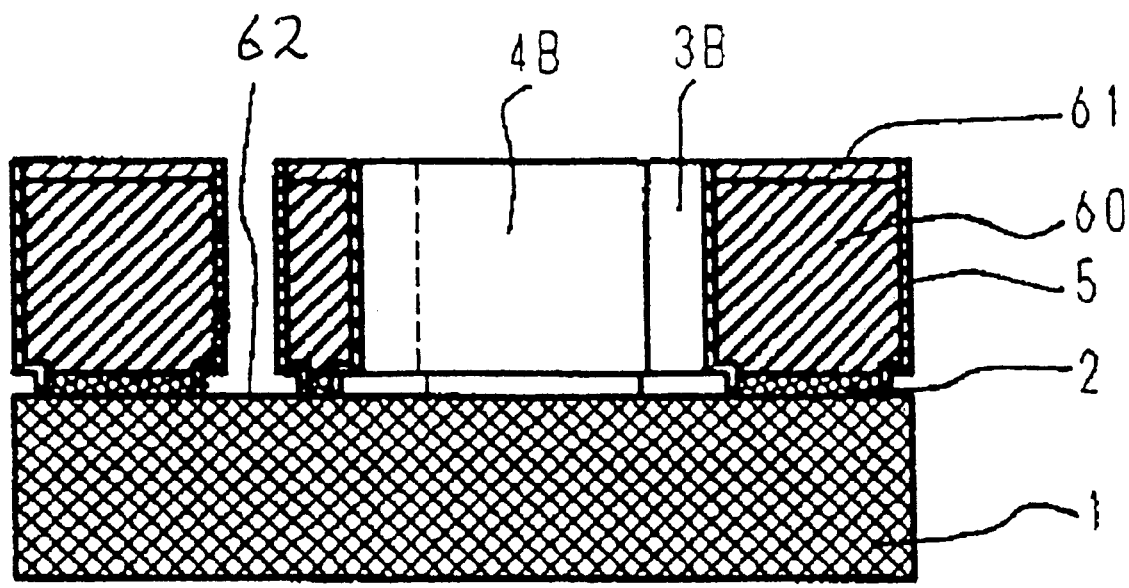
Figure 8C:
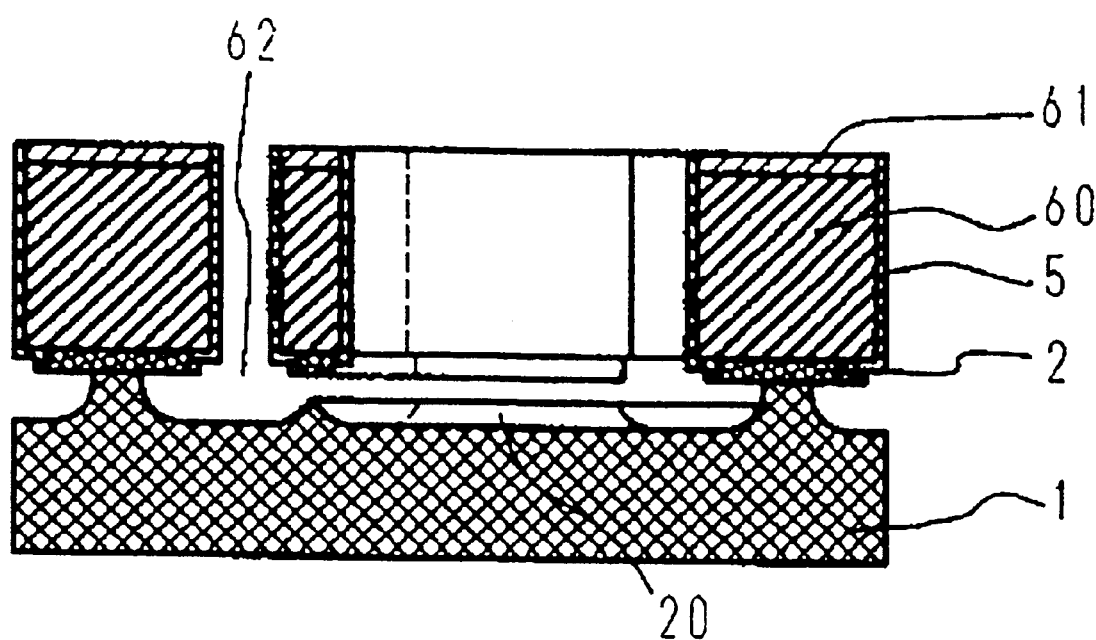

The above novel microactuator may be fabricated as follows. FIGS. 8A through 8C are fragmentary cross sectional elevation views illustrative of second novel actuators with improved substrate structures of FIG. 7 in sequential processes involved in a novel method of fabricating the same in a first embodiment in accordance with the present invention.

With reference to FIG. 8A, and SOI substrate was prepared which comprises a semiconducotr substrate 1 having a thickness of 500 micrometers, a silicon dioxide film 2 having a thickness of 0.5 micrometers, and a silicon layer 60 having a thickness of 20 micrometers. A silicon dioxide film 61 having a thickness of 3 micrometers is deposited on the silicon film 60. A photo-lithography is used to pattern a photo-resist for carrying out a dry etching process patterning the silicon dioxide film 61. The silicon film 60 is selectively removed by a plasma etching method using chlorine gas.

With reference to FIG. 8B, the silicon oxide film 2 is removed by the hydrofluoric acid solution so as to show the surface 62 of the substrate 1. The etching time is so adjust that the silicon oxide film 2 remains under the stator electrode 3B and the movable electrode 4B. This sample is placed into the thermal oxidation chamber and the low pressure chemical vapor deposition system to form the insulation films 5 on the silicon stator and movable electrodes 3B and 4B. A plasma etching is carried out to show the surface of the silicon substrate 1 so that the insulation film 5 remains on side walls of the movable electrode 4B and the stator electrode 3B.

With reference to FIG. 8C, this sample is dipped into an etchant including a fluorine acid, a nitric acid and an acetic acid at a ratio of 1:89:10 so that the shown part 62 of the silicon substrate 1 is first etched and then other surface regions of the substrate under the movable electrode 4B and the stator electrode 3B are subsequently etched. This wet etching is continued until the recessed portions 20 are formed between the substrate surface and the bottom of the movable electrode 4B.

In accordance with the above novel microactuator, the recessed portions 20 is formed between the bottom of the movable part and the substrate surface. This recessed portion 20 forms inter-space between the movable parts 4 and the substrate 1 to securely prevent the movable parts 4 from contact with the substrate 1, whilst the projections 6 are to mechanically support or fix the stators 3. Even if the movable parts 4 are made into contact with the substrate 1 accidentally, the adhesion force between the movable parts 4 and the substrate 1 is remarkably small. During the separation process involved in the fabrication processes for the microactuator, no adhesion between the bottom of the movable part and the substrate surface has appeared. During or operation of the microactuator for much long time by one hundreds times than the conventional one, adhesion between the bottom of the movable part and the substrate surface has appeared.

In accordance with the present invention, it is easy to make rough the surface under the movable electrode. It is further possible to increase the distance between the bottom of the movable part and the substrate surface without increase in thickness of the insulation films, whereby the freedom in design of the microactuator is increased. As described above, long-term highly reliable microactuator may be fabricated by simplified fabrication processes.

Figure 9:
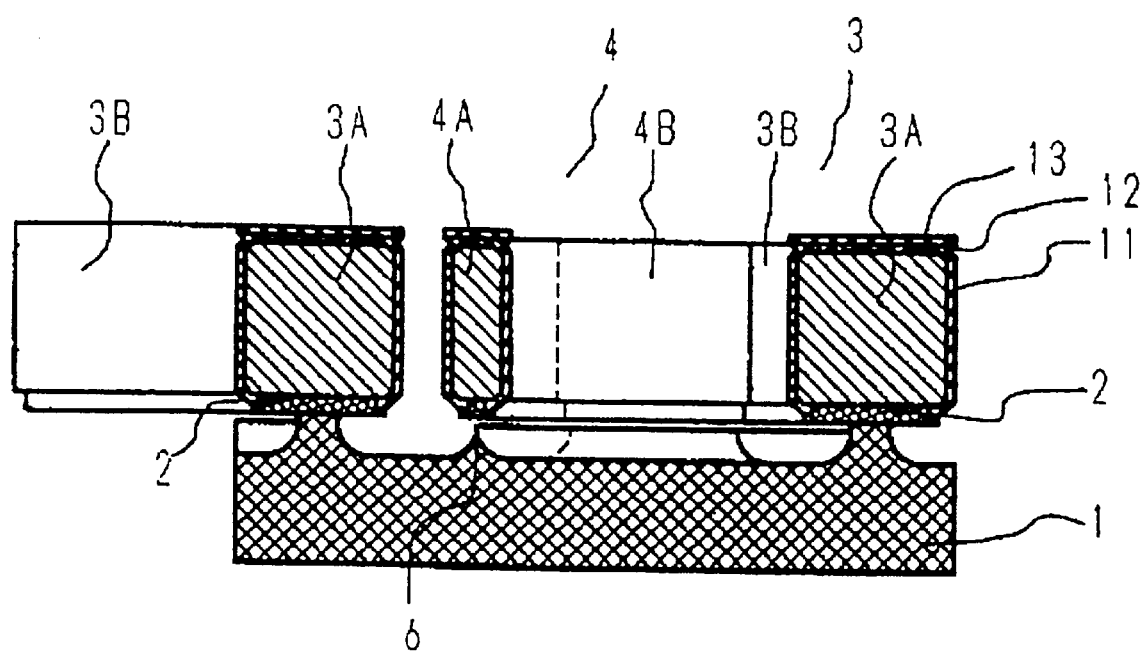
FIG. 9 is a cross sectional elevation view illustrative of a novel semiconductor microactuator with an improved substrate in a second embodiment in accordance with the present invention.

A second embodiment according to the present invention will be described in detail with reference to the drawings. FIG. 9 is a cross sectional elevation view illustrative of a novel semiconductor microactuator with an improved substrate in a second embodiment in accordance with the present invention.

The microactuator has a stator 3, and a movable part 4. The movable part 4 is supported by spring members 11 which are provided on spring fixing stages 10 fixed to the silicon substrate 1 so that the movable part 4 is floated or isolated from the silicon substrate 1.

The stator 3 has a stator extending portion which extends toward inside regions and in the first direction and also extend along a longitudinal center line. The stator extending portion has many stator comb-tooth portions 3A which extend from both sides of each of the stator extending portions in a second direction perpendicular to the first direction, thereby to form a comb-shape, wherein the stator comb-tooth portions 3A are arranged at a first constant pitch in the first direction and extend in the second direction. Each of the stator comb-tooth portions 3A has comb-tooth shaped stator electrodes 3B which extend from one side of the stator comb-tooth portion 3A, wherein the comb-tooth shaped stator electrodes 3B extend in the first direction at a second constant pitch.

The movable part 4 comprises first and second side frame portions extending in the first direction and separated form each other in the second direction and a center frame portion extending in the second direction to connect the first and second side frame portions to each other. Each of the first and second frame portions has may movable comb-tooth portions 4A which extend from the side toward the longitudinal center line in the second direction, thereby to form a comb-shape, wherein the movable comb-tooth portions 4A are arranged at a third constant pitch in the second direction and extend in the first direction. The many movable comb-tooth portions 4A and the many stator comb-tooth portions 3A are alternatively aligned in the first direction, whereby each of the many movable comb-tooth portions 4A is positioned between adjacent two of the many stator comb-tooth portions 3A. Each of the movable comb-tooth portions 4A has comb-tooth shaped movable electrodes 4B with extend from one side of the movable comb-tooth portion 4A, wherein the comb-tooth shaped movable electrodes 4B extend in the first direction at a fourth constant pitch, so that the comb-tooth shaped movable electrodes 4B and the comb-tooth shaped stator electrodes 3B are alternately aligned in the second direction, whereby each of the comb-tooth shaped movable electrodes 4B is positioned between adjacent two of the comb-tooth shaped stator electrodes 3B. The stator comb-tooth portion 3A is wider in width than the movable comb-tooth portion 4A. The comb-tooth shaped stator electrodes 3B are wider in width than the comb-tooth shaped movable electrodes 4B. The comb-tooth shaped stator electrodes 3B are adhered onto the silicon substrate 1 together with the many stator comb-tooth portions 3A. The comb-tooth shaped movable electrodes 4B are separated or floated from the silicon substrate 1 together with the movable comb-tooth portion 4A.

As illustrated in FIG. 9, corners of the stator 3 and the movable part 4 are rounded. Top surfaces of the movable part 4 and the stator 3 are covered by laminations of a silicon oxide film 12 and a silicon nitride film 13. The silicon nitride film 13 has outward extensions from the edges of the silicon oxide film 12. The silicon oxide film 2 is smaller in lateral size than the stator comb-tooth portion 3A and the movable comb-tooth portion 4A. Side walls of the comb-tooth shaped stator electrodes 3B and the comb-tooth shaped movable electrodes 4B are covered with a silicon nitride film 11 to prevent any formation of the short circuit between the comb-tooth shaped stator electrodes 3B and the comb-tooth shaped movable electrodes 4B even if the comb-tooth shaped stator electrodes 3B and the comb-tooth shaped movable electrodes 4B are made into contact with each other accidentally. The above rounded corners of each of the stator 3 and the movable part 4 make it easy to keep the shapes of the stator 3 and the movable part 4 when the semiconducotr substrate 1 is etched to form a recessed portion to be described below. The above rounded corners of each of the stator 3 and the movable part 4 prevents any appearance of electrostatic discharge from sharp corners upon voltage application across the stator electrode 3B and the movable electrode 4B, wherein the electrostatic discharge maybe capable of breaking the microactuator. The above rounded corners of each of the stator 3 and the movable part 4 make it easy to have the silicon nitride film 11 cover the entire side wall of the stator 3 and the movable part 4.

The above substrate 1 has a surface which comprises recessed portions 20 positioned under the movable parts 4 and projections 6 under the stators 3, wherein the recessed potions 20 are to form inter-space between the movable parts 4 and the substrate 1 to securely prevent the movable parts 4 from contact with the substrate 1, whilst the projections 6 are to mechanically support or fix the stators 3.

A voltage is applied across the comb-tooth shaped movable electrodes 4B and the comb-tooth shaped stator electrodes 3B so that the movable part 4 is driven to be moved in the first direction. The voltage application across the comb-tooth shaped movable electrodes 4B of the movable part 4 and the comb-tooth shaped stator electrodes 3B of the second stator 3 causes the movable part 4 to move toward the second stator 3. The voltage application across the comb-tooth shaped movable electrodes 4B of the movable part 4 and the comb-tooth shaped stator electrodes 3B of the first stator 3 causes the movable part 4 to move toward the first stator 4.

The movable comb-tooth portion 4A may comprise a single crystal silicon pattern having a width of 3 micrometers and a height of 20 micrometers. The stator comb-tooth portion 3A may comprise a single crystal silicon pattern having a width of 10 micrometers and a height of 20 micrometers. The comb-tooth shaped stator electrode 3B may comprise a single crystal silicon pattern having a width of 3 micrometers and a height of 20 micrometers. The comb-tooth shaped movable electrode 4B may comprise a single crystal silicon pattern having a width of 3 micrometers and a height of 20 micrometers. The comb-tooth shaped stator electrode 3B is spaced from the silicon substrate 1. The stator comb-tooth portion 3A is however fixed to the substrate 1 so that the comb-tooth shaped stator electrode 3B is substantially fixed through the stator comb-tooth portion 3A to the substrate 1.

In accordance with the present invention, the above substrate 1 has the recessed portions 20 positioned under the movable parts 4 and the projections 6 positioned under the stators 3. The recessed potions 20 form inter-space between the movable parts 4 and the substrate 1 to securely prevent the movable parts 4 from contact with the substrate 1, whilst the projections 6 are to mechanically support or fix the stators 3. Even if the movable parts 4 are made into contact with the substrate 1 accidentally, the adhesion force between the movable parts 4 and the substrate 1 is remarkably small.

In the above embodiment, the stator and the movable part are coated by the insulation film such as the silicon oxide film or the silicon nitride film. It is, however, possible as a modification that metal films such as tungsten, titanium, titanium nitride may be formed by a chemical vapor deposition method. It is further possible that an amorphous silicon may be formed by a chemical vapor deposition method. It is further possible that an organic thin film may be formed by a chemical vapor deposition method. In pace of the chemical vapor deposition method, a sputtering method or an evaporation method as well as combinations thereof are also available.

In the above embodiment, the projections 6 are formed over the substrate and under the stator 3. It is possible as a modification that, in place of formation of the projections 6, a distance between the bottom of the movable part 4 and the substrate surface is increased to securely prevent the movable parts 4 from contact with the substrate 1, whilst the projections 6 are to mechanically support or fix the stators 3. Even if the movable parts 4 are made into contact with the substrate 1 accidentally, the adhesion force between the movable parts 4 and the substrate 1 is remarkably small. If the distance between the bottom of the movable part 4 and the substrate surface is set 30 micrometers, then there appears no adhesion between the movable parts 4 and the substrate 1 even no projections are formed between the same. If, however, the distance between the bottom of the movable part 4 and the substrate surface is only a few micrometers, then sometimes the adhesion between the movable parts 4 and the substrate 1 appears.

In the above embodiment, the stator is provided on the surface of the semiconductor substrate 1. The above improved substrate structure for the microactuator may be applicable to any various kinds of actuators. The stator is usually formed over the semiconductor substrate. However, the above improved substrate structure may be applicable to the actuator wherein the stator is mounted over the movable part. Alteratively, the above improved substrate structure may also be applicable to the actuator wherein the movable part is mounted over the stator. Further alternatively, the above improved substrate structure may also be applicable to the multilevel structured actuator, wherein a second level movable part or a second level stator is mounted over a first level movable part or a first level stator.

Figure 10A:
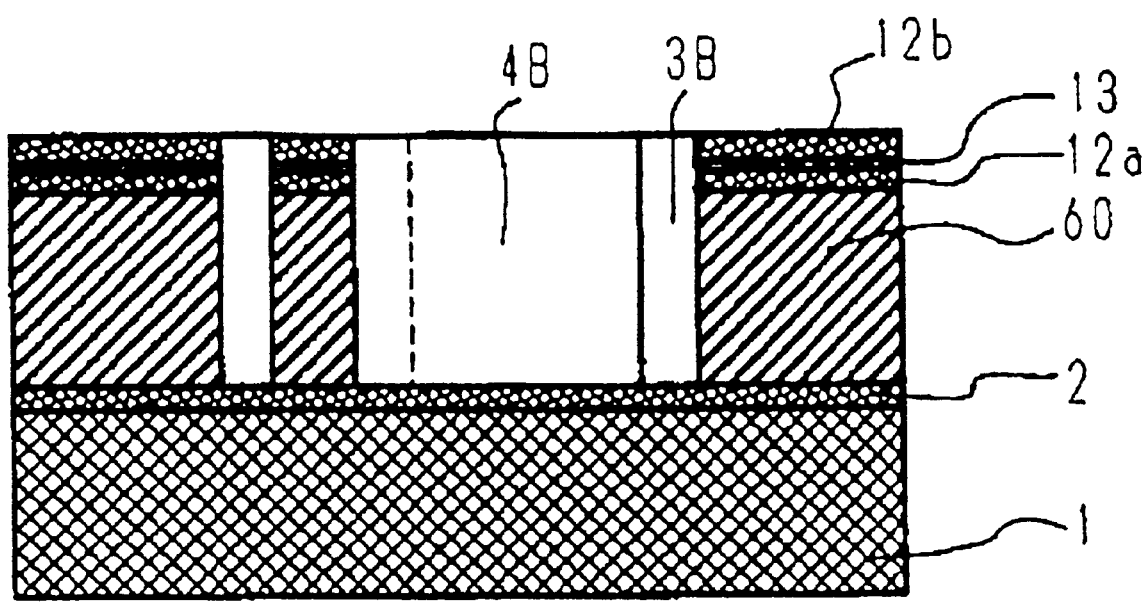
FIGS. 10A through 10C are fragmentary cross sectional elevation views illustrative of second novel actuators with improved substrate structures of FIG. 9 in sequential processes involved in a novel method of fabricating the same in a second embodiment in accordance with the present invention.
Figure 10B:
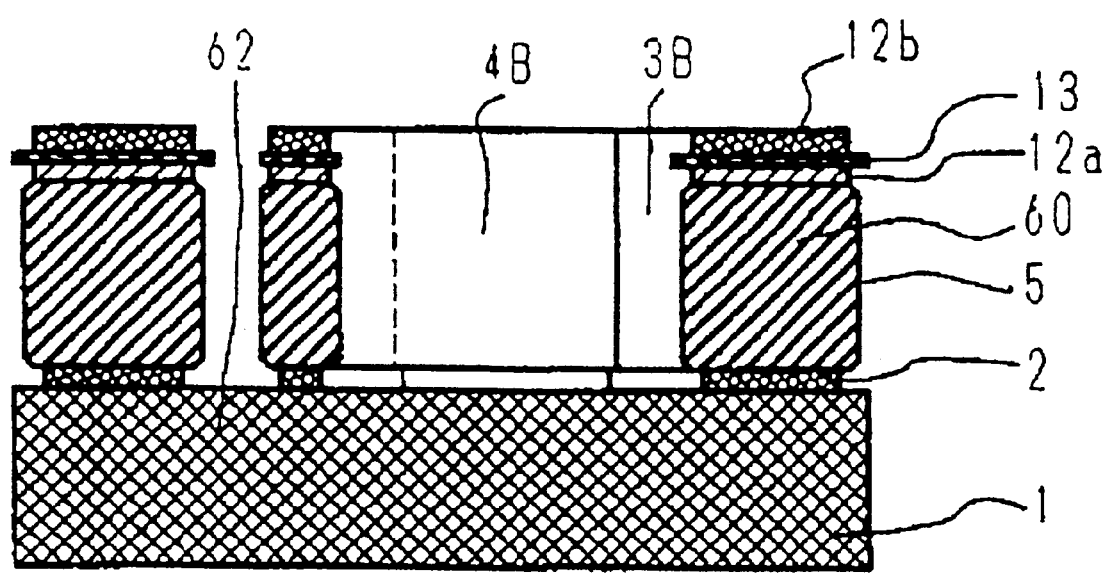
Figure 10C:
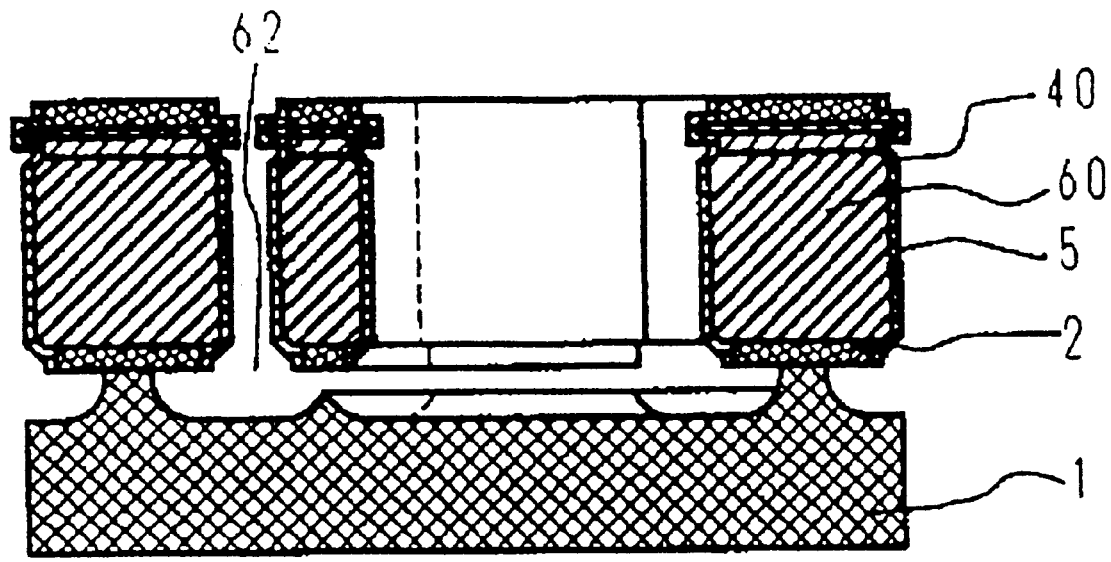

The above novel microactuator may be fabricated as follows. FIGS. 10A through 10C are fragmentary cross sectional elevation views illustrative of second novel actuators with improved substrate structures of FIG. 9 is sequential processes involved in a novel method of fabricating the same in a second embodiment in accordance with the present invention.

With reference to FIG. 10A, an SOI substrate was prepared which comprises a semiconductor substrate 1 having a thickness of 500 micrometers, a silicon dioxide film 2 having a thickness of 0.5 micrometers, and a silicon layer 60 having a thickness of 20 micrometers. A silicon dioxide film 12a having a thickness of 0.2 micrometers is deposited on the silicon film 60. A silicon nitride film 13 having a thickness of 0. 1 micrometer is deposited on the silicon dioxide film 12a. A silicon dioxide film 12b having a thickness of 3 micrometers is deposited on the silicon nitride film 13. A photo-lithography is used to pattern a photo-resist for carrying out a dry etching process for pattering the laminations of the silicon oxide films 12a and 12b and the silicon nitride film 13. The patterned laminations of the silicon oxide films 12a and 12b and the silicon nitride film 13 are used as a mask for carrying out a plasma etching process using chlorine gas to selectively etch the silicon film 60.

With reference to FIG. 10B, the silicon oxide film 2 is removed by the hydrofluoric acid solution so as to show the surface 62 of the substrate 1. The etching time is so adjusted that the silicon oxide film 2 remains under the stator electrode 3B and the movable electrode 4B. The silicon oxide film is automatically formed inside of the pattern of the silicon film 60. The silicon oxide film 12a is also etched at it side portion by the hydrofluoric acid solution so that the silicon oxide film 12a extends inside of the silicon nitride film 13. Therefor, the silicon oxide films 12a and 12b are etched to extend inside of the pattern of the silicon film 60 so that the four corners of the patterns of the silicon film 60 are shown. This sample is dipped into an etchant including a fluorine acid, a nitric acid and an acetic acid at a ratio of 1:89:10 so that the four corners of the patterns of the silicon film 60 are rounded.

With reference to FIG. 10C, this sample is placed into the low pressure chemical vapor deposition system to deposit a silicon nitride film 40 on the silicon electrode surfaces. A plasma etching is carried out to show the surface 62 of the silicon substrate 1 so that the silicon nitride film 40 remains on side walls of the movable electrode 4B and the stator electrode 3B. Subsequently, this sample is dipped into an etchant including a fluorine acid, a nitric acid and an acetic acid at a ratio of 1:89:10 so that the shown part 62 of the silicon substrate 1 is first etched and then other surface regions of the substrate under the movable electrode 4B and the stator electrode 3B are subsequently etched. This we etching is continued until the recessed portions 20 are formed between the substrate surface and the bottom of the movable electrode 4B.

In accordance with the above novel microactuator, it is important that the plane pattern of the silicon films 60 is included inside of the plane of the silicon nitride film 13 and that the silicon film patterns 60 have the rounded corners. Small pin holes are likely to be formed in the insulation films on the sharp corners. The formation of the small pin holes is cased by excess promotion of the etching to the sharp portion during the etch-back process. Once the pin holes have been formed, then the pin holes allow that the movable part electrode end the stator electrode are also subjected to the etchant which is using for carrying out the wet etching to the silicon substrate surface to form the recessed portions and the projections over the silicon substrate. Particularly when the substrate should be etched deeply, for example, not less than 10 micrometers, then the predetermined shapes of the stator electrode and the movable electrode are disappeared. The rounded corners of the stator electrode and the movable electrode and the peaked or extending portion of the silicon nitride film suppresses any formation of pin holes upon the etch-back process.

In accordance with the above novel microactuator, the recessed portions 20 is formed between the bottom of the movable part and the substrate surface. This recessed potion 20 forms inter-space between the movable parts 4 and the substrate 1 to securely prevent the movable parts 4 from contact with the substrate 1, whilst the projections 6 are to mechanically support or fix the stators 3. Even if the movable parts 4 are made into contact with the substrate 1 accidentally, the adhesion force between the movable parts 4 and the substrate 1 is remarkably small. During the separation process involved in the fabrication processes for the microactuator, no adhesion between the bottom of the movable part and the substrate surface has appeared. During or operation of the microactuator for much longer time by one hundreds time than the convectional one, adhesion between the bottom of the movable part and the substrate surface has appeared.

In accordance with the present invention, it is easy to make rough the surface under the movable electrode. It is further possible to increase the distance between the bottom of the movable part of the substrate surface without increase in thickness of the insulation films, whereby the freedom in design of the microactuator is increased. As described above, long-term highly reliable microactuator may be fabricated by simplified fabrication processes.

Whereas modifications of the present invention will be apparent to a person having ordinary skill in the art, to which the invention pertains, it is to be understood that embodiments as shown and described by way of illustrations are by no means intended to be considered to a limiting sense. Accordingly, it is to be intended to cover by claims all modifications which fall within the spirit and scope of the present invention.

What is claimed is:

1. A semiconductor substrate for a microactuator having at least a movable part and a stator,
wherein said semiconductor substrate has a plurality of semiconducotr tapered projections being unitary formed with said semiconductor substrate and being in contact with only part of said stator, and at least a recessed portion defined in plane shape by said semiconductor tapered projections so that said recessed portion extends udner entire bottom surfaces of said movable part and under partial bottom surfaces of said stator.

2. The semiconducotr substrate for the microactuator as claimed in claim 1, wherein a height of said semiconductor tapered projections defines a depth of said recessed portion, and said depth is not less than about 10 micrometers.

3. A microactuator having semiconductor substrate, at least a movable part and a stator,
   wherein said semiconductor substrate has a plurality of semiconductor tapered projections being unitary formed with said semiconductor substrate and being in contact with only part of said stator, and at least a recessed portion defined in plane shape by said semiconductor tapered projections so that said recessed portion extends under entire bottom surfaces of said movable part and under partial bottom surfaces of said stator.

4. The microactuator as claimed in claim 3, wherein said movable part and said stator have bottom surface covered with insulation films on tops of said semiconductor tapered projections, so that said bottom surfaces of said movable part and said stator are isolated by said insulation films from said tops of said semiconductor tapered projections.

5. The microactuator as claimed in claim 3, wherein at least nay one of said movable part and said stator has at least one rounded corner.

6. The microactuator as claimed in claim 3, wherein at least any one of said movable part and said stator has side walls covered with an insulation film.

7. The microactuator as claimed in claim 3, wherein a height of said semiconductor tapered projections defines a depth of said recessed portion, and said depth is not less than about 10 micrometers.

8. The microactuator as claimed in claim 3, wherein a top surface of at least any one of said stator and said movable part is covered by laminations of a silicon oxide film and a silicon nitride film, and said silicon nitride film has peaked portions extending outwardly from edges of said silicon oxide film.

* * * * *